United States Patent
Heflinger et al.

[11] 3,797,938
[45] Mar. 19, 1974

[54] OPTICAL APPARATUS FOR MEASURING DEFORMATION OF PARABOLIC ANTENNAS

[75] Inventors: Lee O. Heflinger, Torrance; Ralph F. Wuerker, Palos Verdes, both of Calif.

[73] Assignee: TRW Inc., Redondo Beach, Calif.

[22] Filed: Oct. 16, 1972

[21] Appl. No.: 297,745

[52] U.S. Cl. .................. 356/109, 350/3.5, 356/124
[51] Int. Cl. ............................................. G01b 9/02
[58] Field of Search .................. 356/106, 109, 113; 350/3.5

[56] References Cited
OTHER PUBLICATIONS

"Holography at the Crossroads" G. B. Brandt, Optical Spectra; October 1970.
"Testing Aspherics Using 2-Wavelength Holography" 10 Applied Optics 2113 September, 1971.

*Primary Examiner*—Ronald L. Wibert
*Assistant Examiner*—Conrad Clark
*Attorney, Agent, or Firm*—Daniel T. Anderson, Esq.; Edwin A. Oser, Esq.; Jerry A. Dinardo

[57] ABSTRACT

An optical apparatus for recording by double exposure either a hologram or a holographic contour map of a parabolic antenna. The holographic apparatus requires a laser and is arranged so as to function with practical lasers such as a ruby laser having limited coherence and limited light power. Although the antenna is a paraboloid it may be considered an ellipsoid with conjugate foci for purposes of this invention. Accordingly, the scene beam is reflected onto the antenna from a point image source close to one of the foci of the parabolic antenna while the hologram is at the conjugate focal point of the antenna. The path length of the reference beam is matched to that of the scene beam to provide temporal coherence matching. The light may be scattered by a diffuse reflecting ball in one of the foci of the antenna or alternatively a specularly reflecting ball may be used. This ball may be gold plated to improve the reflection of the ruby light. For contouring of the antenna one of the reflectors in the path of the reference beam may be hinged to change the angle of the reference beam between exposures, each being taken at a different wavelength.

7 Claims, 3 Drawing Figures

PATENTED MAR 19 1974

OPTICAL APPARATUS FOR MEASURING DEFORMATION OF PARABOLIC ANTENNAS

BACKGROUND OF THE INVENTION

This invention relates generally parabolic an optical apparatus for recording the deformation of large parablolic dish antennas and particularly relates to a holographic apparatus for holographically recording the deformation of an antenna either by an interferometric hologram or by an interferometric contour map.

Interferometric holography has proven to be a powerful tool for the non-destructive testing of deformable objects. The problem arose of measuring the deformation of a large parabolic antenna having a diameter of 9 feet. In order to measure the deformation with minimal disturbance by other factors such as air convection and vibration, it is necessary to carry out the holographic exposures within a very short period of time. This generally requires the use of a pulsed laser such as a ruby laser.

However, it is well known that such a ruby laser has both limited coherence and limited light power.

It is accordingly an object of the present invention to provide an optical apparatus for measuring interferometrically the deformation of a large parabolic antenna.

Another object of the present invention is to provide such a holographic apparatus which permits to obtain both an interferometric hologram by double exposure or a holographic contour map by double exposure with different wavelengths.

A further object of the invention is to provide a holographic apparatus having a virtual light source in one of the conjugate foci of the antenna which may be realized by a light scattering ball or a specularly reflecting sphere.

SUMMARY OF THE INVENTION

An optical apparatus in accordance with the present invention may be used for recording a holographic interferogram by double exposure. Alternatively, the apparatus may be used to record a contour map also by 2 wavelength or two frequency holographic contouring. The object to be recorded may be a parabolic antenna of large diameter. Thus a 9 foot diameter antenna has been recorded, the antenna being disposed in a space simulation chamber under conditions of high vacuum, with the chamber walls cooled to liquid nitrogen temperature and the antenna heated by a simulated solar source.

The apparatus comprises a light source for generating a coherent light beam such, for example, as a pulsed ruby laser. Means are provided for splitting the light beam into a reference beam and a scene beam. A recording material is disposed substantially in one of the foci of the antenna. Means are disposed in the conjugate focus of the antenna for reflecting the scene onto the entire antenna and back toward the recording material.

Finally, means are provided for directing the scene beam onto the scene beam reflector and for directing the reference beam onto the recording material so that the path length of the reference beam substantially equals the path length of the scene beam.

Since the antenna is parabolic it does not have, strictly speaking, two conjugate foci. However, it may be treated as if it were an ellipsoid. For example, for a 9 foot antenna with a ratio of focal length to the diameter of 0.4 and tested from a distance of 20 feet, there is approximately a 1 inch deviation of path length between an optimally chosen focal point near the paraboloid's focus and the conjugate focus at 20 feet. That is, the variation in path lengths between the two foci via various points of the antenna is only about 1 inch. For a true ellipsoid this variation would be zero and it has been found that the 1 inch variation is tolerable and permits the paraboloid to be treated as an ellipsoid.

Thus, basically in accordance with the invention the scene beam is reflected or scattered at a point situated substantially in one of the foci of the antenna while the recording material is disposed substantially at the other focal point of the antenna. The path lengths of reference and scene beams are matched to provide temporal coherence. The invention is based on the recognition that a parabolic antenna may be treated as if it were an ellipsoid so that the light emanating from one of the foci is returned to the conjugate focus.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
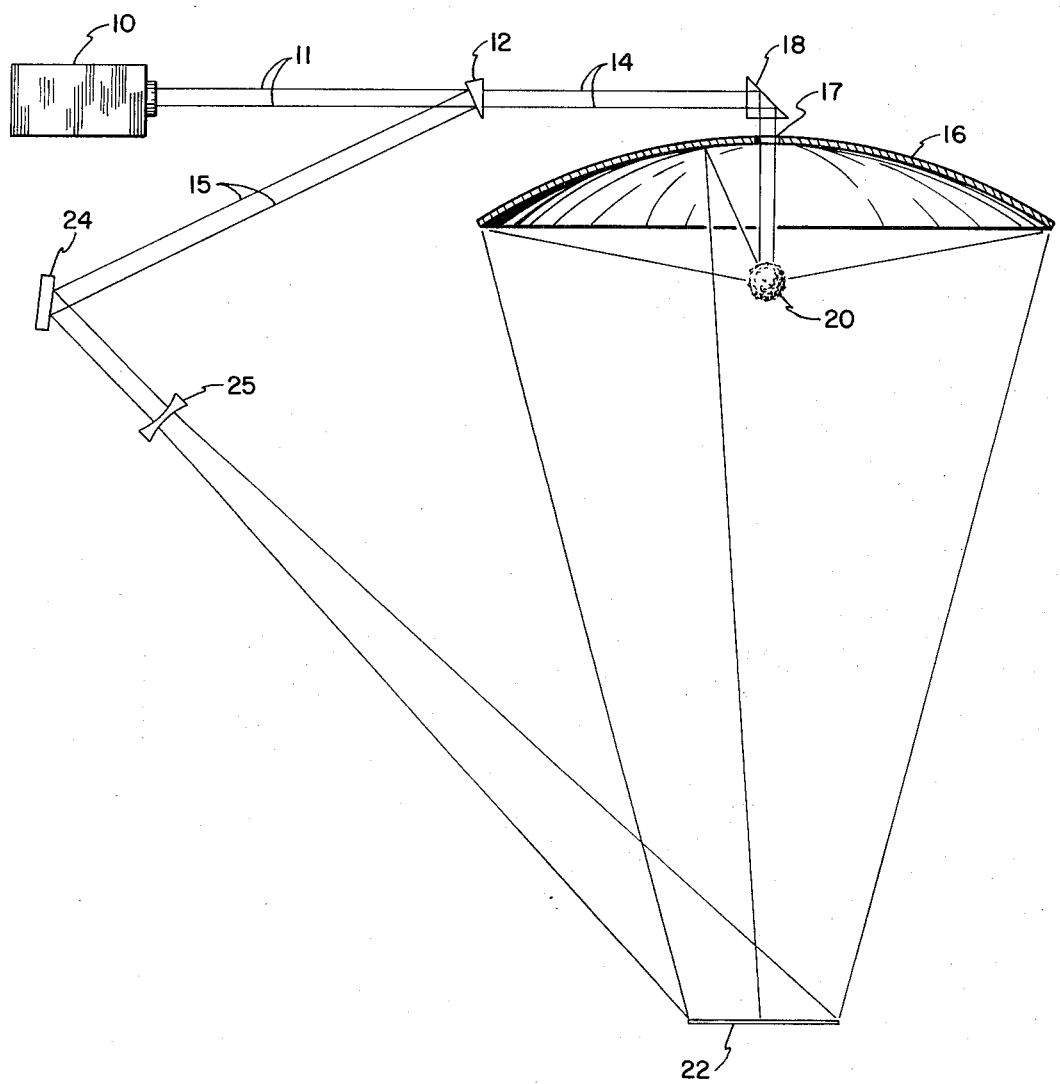
FIG. 1 is a schematic representation of an optical apparatus in accordance with the present invention for recording a holographic interferogram of a parabolic antenna.

Referring now to FIG. 1, there is illustrated one embodiment of an optical apparatus in accordance with the present invention. The apparatus of FIG. 1 is particularly suitable for recording holographically the deformation of an object by double exposure. As shown in FIG. 1, there is provided a light source 10 for generating a coherent light beam. Thus, the light source 10 preferably consists of a laser such as a pulsed ruby laser to generate a coherent light beam 11. The light beam 11 is split into a scene beam 14 and a reference beam 15 by a suitable beam splitter 12. This has been illustrated in FIG. 1 as a wedge or prism 12 which may, for example, consist of glass.

The scene beam 14 is now caused to pass through the object 16 to be recorded. The object 16 consists of a conventional parabolic antenna having a central opening 17 through which the antenna feed may be passed. The scene beam 14 may be reflected by a suitable reflector 18 which may, for example, consist of a right angle prism. It passes the scene beam through the antenna opening 17 onto a ball 20 which constitutes a virtual point light source.

The ball 20 may, for example, be a light scattering ball. This may simply consist of the diffused side of conventional household aluminum foil wrapped about a sphere. This will essentially provide a light scatterer of substantially spherical shape. It was initially found that such a scattering ball provides a more uniform illumination of the antenna 16. However, it was also found that such a scattering ball does not provide fine, high contrast interference fringes.

Accordingly, it is preferred to use a specularly reflecting sphere such, for example, as a ball bearing. This will provide substantially a point light source.

It has been found that if the ball is gold plated it will provide better reflection of the light of a ruby laser.

Alternatively, it is feasible to provide such a point light source by means of a suitable lens such, for example, as a microscope objective. However, a specularly reflecting ball is more easily made and may provide more light.

As indicated before, the ball 20 is disposed substantially in one of the foci of the parabolic antenna. For purposes of the invention the parabolic antenna 16 is assumed to be an ellipsoid having two conjugate foci. It may be noted that the antenna was painted with a glossy white paint. The light which is used to form the hologram is the specular component reflected by the glossy surface. The diffuse light component scatters in all directions and its contribution at the hologram is negligible.

It is the use of this specular component (about 4 percent of the total light) together with the particular conjugate foci geometric configuration described, which creates an over all light efficiency high enough so that practical lasers can record large parabolic antennas.

The recording material 22 is disposed substantially at the conjugate focus of the antenna. The recording material may, for example, consist of a suitable photographic emulsion such as a photographic plate or film. As indicated before, the parabolic antenna 16 is treated as if it were an ellipsoid. The departure of the parabolic antenna from a true ellipsoid would be expected to cause some focusing error in returning the light to the hologram. However, it has been found that the usual surface irregularities of the glossy paint are sufficient to cause essentially uniform illumination of the hologram from all parts of the antenna.

The reference beam 15 is directed by a reflector 24 such, for example, as a front surface mirror onto the recording material 22. The reference beam 15 may be enlarged by a negative lens 25 so that the reference beam substantially fills the area of the recording material 22. The location of this beam splitter 12 is adjusted so that the scene and reference path lengths are equal. This permits high quality holograms to be made with lasers of limited temporal coherence.

The holographic apparatus of FIG. 1 operates in a conventional manner. A first hologram is recorded of the undistorted antenna 16. Thereafter the antenna is distorted, for example, by a mechanical force exerted on it by a change of temperature or the like, then a second hologram of the distorted antenna is recorded on the same recording material 22. After developing the recording material 22 the hologram may be reconstructed by a reference beam having approximately the same relation to the hologram as did the reference beam 15 during recording. It will show fringes indicative of the deformation of the antenna. These fringes are caused by the differences of the path lengths of the light of the scene beam for the two exposures. Hence the fringes indicate the deformation. Each fringe corresponds to approximately $13 \times 10^{-6}$ inches of deformation. The exact value for each fringe can be computed from the angles the light makes with the antenna and the wavelength of light.

Figure 2:
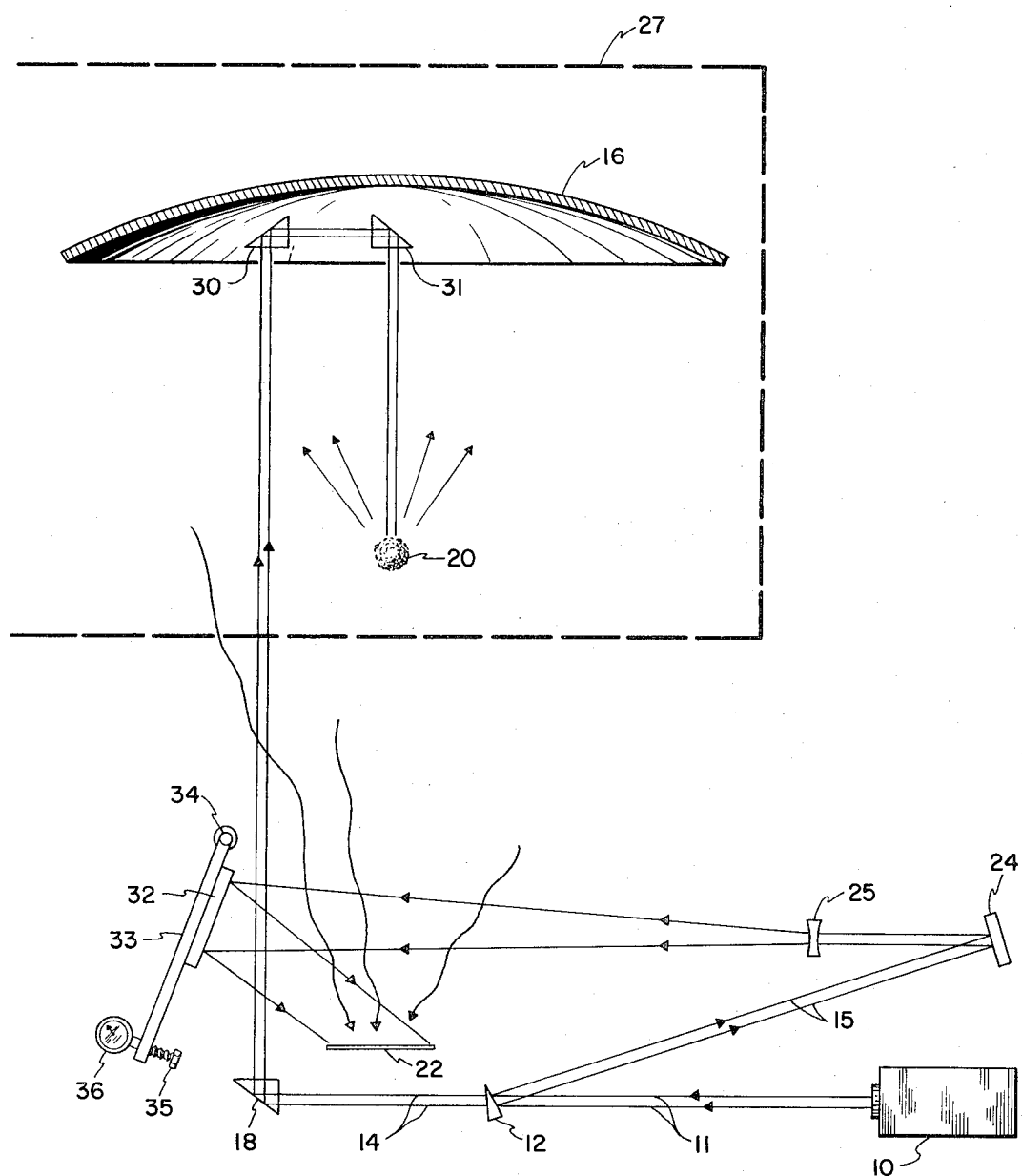
FIG. 2 is a schematic representation of a modified apparatus in accordance with the present invention for recording either a holographic interferogram or a holographic contour map of an antenna which may be situated in a space simulation chamber.

Referring now to FIG. 2, there is illustrated a modified holographic apparatus in accordance with the present invention. The parabolic antenna 16 may be disposed in a space simulation chamber 27. This may be subjected to a high vacuum within walls cooled by liquid nitrogen and the antenna heated by a simulated solar radiator. This will of course simulate conditions to which such a large antenna is subjected in space as it passes in and out of the earth's shadow. The purpose of the apparatus of FIG. 2 is to measure the actual deformation of the antenna while subjected to these high and low temperature conditions, that is primarily the deformation due to the changes in solar radiation.

The beam from the laser 10 is again split by a beam splitter 12 into a scene beam 14 and a reference beam 15. The scene beam 14 is reflected by a reflector such as the right angle prism 18 toward the antenna 16.

Due to the fact that the antenna is now disposed in the space chamber, it is no longer practical to illuminate it from the rear. Therefore, a pair of reflectors 30 and 31 are disposed near the antenna 16 to direct the scene beam onto the ball 20. The reflectors 30 and 31 may consist of right angle prisms as does the reflector 18.

The ball 20 is again disposed at one of the conjugate foci of the antenna. The recording material 22 is disposed at the conjugate focus. The reference beam 15 is again reflected by a reflector 24 and enlarged by a negative lens 25. It is then directed by an additional reflector 32 onto the recording material 22. The reflector 32 is mounted on a plate 33 having a pivot point 34 so that the reflector or mirror 32 may be rotated about the point 34. Rotation may be effected by a set screw 35 and the amount of movement may be indicated by the dial indicator 36.

The holographic apparatus of FIG. 2 operates in the same manner as does that of FIG. 1 for recording holographic interferograms by double exposure. For this mode of operation the reflector 32 remains in a fixed position.

However, it is also feasible with the apparatus of FIG. 2 to record a contour map of the antenna 16 to show its absolute shape rather than its relative deformation.

A simple conceptual picture of how a double-exposed hologram, exposed with different light frequencies for each exposure, creates a contour map of the surface configuration is as follows. The first exposure at the first optical frequency records a hologram of the object. The second exposure at the second optical frequency also records the object. After development the hologram is reconstructed say with light of the first frequency. The image reconstructed by the first exposure's contribution is therefore an exact duplication of the object. However, the image reconstructed by the second exposure's contribution is not quite identical to the original object because the reconstruction light frequency is not quite the same as the recording light frequency. The effect of this frequency shift is to slightly shift the position or magnify the reconstructed object. Thus the total reconstructed image consists of two slightly different images of the object. However, as both of these images are formed with the same frequency reconstruction light, they can interfere with each other.

It is this interference process which creates the fringes observed which show up the minute differences between the images. A full analysis shows that with the proper arrangement the interference fringes produced correspond to range contours. Thus the two frequency holographic contouring technique effectively uses two frequencies to create an interference pattern which corresponds to contours of equal distance over the object. The contour interval depends upon the difference in optical frequency between the two exposures, being larger for smaller frequency differences. In terms of the optical wavelength the contour interval is $1/2 \lambda_1 \lambda_2/(\lambda_1 - \lambda_2)$.

With the apparatus of the present invention, FIG. 2, contour maps of the antenna are achieved by first illuminating the antenna 16 with coherent light of one frequency and then to illuminate the antenna again at some later instant of time with coherent light of a different frequency. An example is shown in FIG. 4 which will be subsequently described.

Experiments have shown that when the contour interval is very small it is necessary to change the angle of the reference beam between exposures. This is effected by rotating the screw 35 to rotate the plate 33 about its pivot point 34. It is feasible, for example, to operate a ruby laser first at the ruby transition $R_2$ and subsequently to operate either the same ruby laser or another one at the ruby transition $R_1$. In this case it has been found that the reflector 32 has to be rotated through a few milliradians, where 1° corresponds approximately to 17 milliradians. The actual amount of rotation is best determined experimentally by a series of exposures.

The two laser frequencies which are required for recording a contour map may, for example, be obtained as disclosed and claimed in the applicants' prior U.S. Pat. No. 3,603,685. Alternatively, the teachings of the prior Wuerker U.S. Pat. No. 3,603,684 may be used. It has been found experimentally that when using the two ruby laser lines corresponding to the transitions $R_1$ or $R_2$ in the apparatus of FIG. 2 that it is necessary to rotate the angle of the reference beam at the recording material.

It should be noted that for the two ruby transitions $R_1$ and $R_2$ contour lines with contours of approximately 7 mils or approximately 0.17 millimeter are produced. In some cases it may be important to carry out the two exposures with very short time intervals. This is to prevent the occurrence of displacement fringes in addition to the contour lines.

For the geometry of FIG. 2 the contours indicate the departures of the parabolic antenna from the ellipsoid which passes through the paraboloid's vertex with foci at the scatter ball and observer's eye.

It should be remarked here that there are cases when it is not necessary to move the reference mirror between exposures to obtain contour maps. This situation can arise from either of two causes. First if the contour interval is sufficiently coarse, created by a very small optical frequency diference, then it is not necessary to shift the reference mirror between exposures. Secondly, if the departures of the paraboloid to be tested from the testing ellipsoid geometry is small, and the reference angle is small, then it is not necessary to shift the reference mirror between exposures. This latter case functions because the apparent number of fringes will be few in this case and thus their large size or coarseness does not require high resolution. However, for the case used as the principal example in this application it has been found that a shift of the reference beam direction in necessary in consequence of the small size of the contour interval in conjunction with the approximately 1 inch departure between the paraboloid and ellipsoid.

Returning now to the topic of relative deformation measurement by double-exposure holography it has been found that sometimes the deformation of the antenna due to temperature changes may be rather substantial. Such large deformations are difficult to follow by holographic interferometry. However, it is feasible to record on a substantially continuous basis such deformations by a sequence of double-exposed holograms. This permits, of course, to follow the fringes caused by the deformation.

A continuous chain of double-exposed holograms may be made in the following manner. At first a single photographic plate is positioned at the proper antenna focal point. After one exposure has been made, a second photographic plate is disposed adjacent the first plate, then a second exposure is made and the first plate is developed. The first plate is then replaced by a fresh unexposed third photographic plate and a third exposure is carried out. Thereupon the second plate is developed and the procedure is continued in the same manner.

Figure 3:
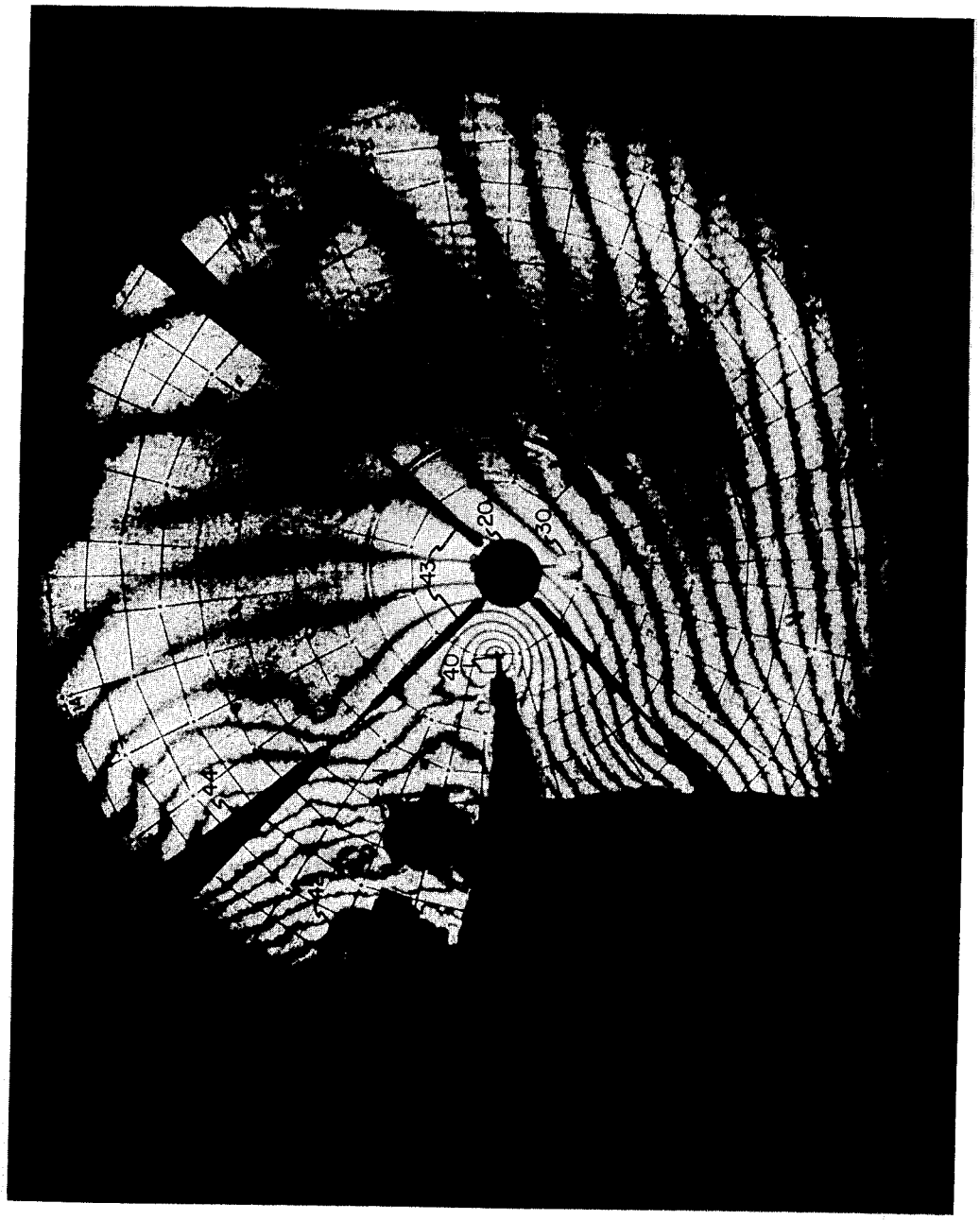
FIG. 3 is a reconstruction from a double-exposure holographic interferogram of an antenna recorded by the apparatus of the invention of FIG. 2.

Reference is now made to FIG. 3 which shows a reconstruction of a hologram of an antenna obtained with the apparatus of FIG. 2. The distortion of the antennas is caused by the finger 40 of one of the inventors touching the antenna. The person is seen in silhouette at 41 while his shadow is visible at 42. The sphere 20 is behind the circular support plate shown at the center with three support elements 43, their shadows being visible at 44. The interference or distortion fringes are clearly shown. It should be noted that they are somewhat wavy in the neighborhood of the person shown at 42 due to his body heat. It is also evident that the right-hand side of the contour map shows less light which is due to the fact that the ball 20 was inadvertently slightly mispositioned from the precise focus. One of the two light reflectors is shown at 30; the other being hidden by the ball support plate and ball 20. As shown by comparison with the person 41, it will be evident that the antenna is 9 feet in diameter.

Reference is now made to FIG. 4. This is a photograph of the reconstruction of a contour hologram or contour map. The contour map was made from a portion of a small, that is a 4 foot diameter antenna. The contour map was recorded by sequentially illuminating the antenna with the apparatus of FIG. 2, with the two ruby transition lines $R_1$ and $R_2$ having wavelengths of 6,943 AU and 6,928 AU respectively. The reference beam angle was changed between exposures approximately by 2 milliradians by operating the screw 35 of the apparatus of FIG. 2.

There has thus been disclosed a holographic apparatus for recording holographically deformation of large parabolic antennas. One of the embodiments requires a minimum of optical elements in a vacuum chamber in which the antenna is disposed. The apparatus permits to measure deformation of the antenna by holographic interferometry and the absolute shape of the antenna by a holographic contour map obtained by illuminating the antenna with two distinct wavelengths of coherent light. Due to the fact that the deviation of a parabolic antenna from an ellipsoid is relatively small, it is possible to direct substantially all of the specularly reflected light from one focal point of the antenna to the other where the recording material is disposed. This makes it possible to provide holographic interferometry of large objects in spite of the limited light power and coherence of a pulsed ruby laser.

What is claimed is:

1. An optical apparatus for recording holographic interferograms of a parabolic antenna, the antenna having a shape approximating that of an ellipsoid, whereby the antenna has conjugate foci, said apparatus comprising:
    a. a light source for generating a coherent light beam;
    b. means for splitting said light beam into a reference beam and a scene beam;
    c. a recording material disposed substantially in one of the foci of the antenna;
    d. means disposed substantially in the conjugate focus of the antenna for reflecting said scene beam onto the antenna;
    e. means for directing said scene beam onto said means for reflecting said scene beam; and
    f. means for directing said reference beam onto said recording material in such a manner that the path length of said reference beam from said means for splitting to said recording material substantially equals the path length of said scene beam from said means for splitting to said recording material.

2. Optical apparatus as defined in claim 1 wherein said means for reflecting said scene beam consists of a light scattering medium having substantially the shape of a sphere.

3. Optical apparatus as defined in claim 1 wherein said means for reflecting said scene beam consists of a specularly reflecting sphere.

4. Optical apparatus defined in claim 3 wherein said light source is a pulsed ruby laser and wherein said sphere is gold coated to maximize its reflectivity for light from said ruby laser.

5. Optical apparatus as defined in claim 1 wherein the antenna has a central feed hole and wherein said means for directing said scene beam directs said scene beam through said feed hole onto said means for reflecting said scene beam.

6. Optical apparatus for recording holographic interferograms of a parabolic antenna of large size, the antenna having substantially the shape of an ellipsoid to provide conjugate foci, said apparatus comprising:
    a. a laser for generating a coherent light beam;
    b. means for splitting said light beam into a reference beam and a scene beam;
    c. means disposed substantially in one of the foci of the antenna for reflecting the scene beam onto the antenna;
    d. a recording material disposed substantially in the conjugate focus of the antenna;
    e. means for directing said scene beam onto said means for reflecting said scene beam, whereby the scene beam is reflected substantially equally from all portions of the antenna onto the recording material; and
    f. means for directing said reference beam onto said recording material, said means for directing said reference beam including a reflector, and being so arranged that the path length of said reference beam from said means for splitting to said recording material substantially equals the length of the path of said scene beam from said means for splitting to said recording material.

7. Optical apparatus as defined in claim 6 adapted for providing a holographic contour map of the antenna, wherein means is provided for adjusting said reflector in the path of said reference beam to change the angle of the reference beam at said recording material in accordance with changes of the frequency of the laser beam used for recording the contour map.

* * * * *

UNITED STATES PATENT OFFICE
CERTIFICATE OF CORRECTION

Patent No. 3,797,938   Dated March 19, 1974

Inventor(s) Lee O. Heflinger and Ralph F. Weurker

It is certified that error appears in the above-identified patent and that said Letters Patent are hereby corrected as shown below:

Column 1, line 6 "parabolic" should be deleted and --to-- substituted therefor.

line 59 after "scene" the word --beam-- should be inserted.

Column 6, line 9 "in" should be cancelled and --is-- substituted therefor.

line 44 "42" should be cancelled and --41-- substituted therefor.

Column 8, claim 4 was omitted in its entirety and should be added as follows:

--4. Optical apparatus as defined in claim 3 wherein said sphere is polished metal.-- line 1 the numeral "4" should be cancelled and --5-- substituted therefor.

line 5 the numeral "5" should be cancelled and --6-- substituted therefor.

line 10 the numeral "6" should be cancelled and --7-- substituted therefor.

line 36 after "claim" the numeral "6" should be cancelled and --7-- substituted therefor.

Signed and sealed this 12th day of November 1974.

(SEAL)
Attest:

McCOY M. GIBSON JR.
Attesting Officer

C. MARSHALL DANN
Commissioner of Patents